United States Patent [19]
Wallén

[11] 3,943,033
[45] Mar. 9, 1976

[54] SCREW THICKENER
[75] Inventor: Lennart E. O. Wallén, Stockholm, Sweden
[73] Assignee: Lennart Wallen & Co AB, Stockholm, Sweden
[22] Filed: Apr. 5, 1974
[21] Appl. No.: 458,439

[30] Foreign Application Priority Data
Apr. 5, 1973 Sweden.............................. 7304808

[52] U.S. Cl. ................ 162/232; 100/117; 100/147; 162/18; 210/414
[51] Int. Cl.² .......................................... D21C 9/18
[58] Field of Search ....... 162/18, 56, 261, 232, 293; 100/73, 93 S, 117, 147; 34/70; 210/414; 425/84, 376 R, 376 A

[56] References Cited
UNITED STATES PATENTS

| | | | |
|---|---|---|---|
| 2,771,361 | 11/1956 | Birdseye et al. .................. | 162/56 X |
| 3,092,338 | 6/1963 | Reinhall .......................... | 100/117 X |
| 3,098,785 | 7/1963 | Meiler ............................. | 162/56 X |
| 3,154,007 | 10/1964 | Schaub et al. ..................... | 100/147 |

FOREIGN PATENTS OR APPLICATIONS

| | | | |
|---|---|---|---|
| 167,916 | 3/1954 | Australia ........................... | 162/261 |

Primary Examiner—S. Leon Bashore
Assistant Examiner—Marc L. Caroff
Attorney, Agent, or Firm—Kenyon & Kenyon Reilly Carr & Chapin

[57] ABSTRACT

A screw thickener to be used for dewatering fibrous materials and being provided with a stuffing means at the discharge end. Said screw thickener having a hydrostatic superpressure of at least 10 kPa and said stuffing means being actuated by pulling means.

5 Claims, 1 Drawing Figure

U.S. Patent  March 9, 1976  3,943,033
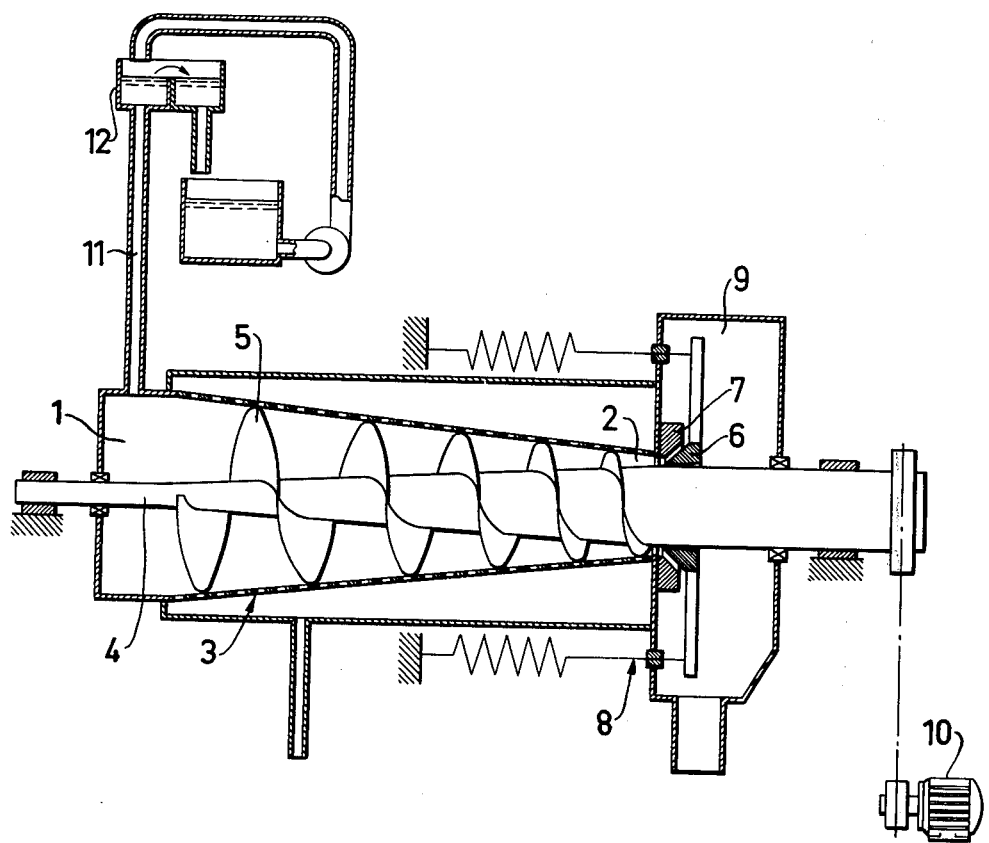

SCREW THICKENER

The present invention relates to a screw thickener for dewatering fibre suspensions with a starting concentration of 1 – 10 %; the screw thickener according to the invention comprises a shaft rotatable in a screen drum and provided with at least one flight mounted in helicoid form, the pitch of the screw preferably being reduced towards the discharge end of the thickener and the screen drum and the envelope of said at least one flight preferably being tapered towards the discharge end and the diameter of the shaft being increased conically towards the discharge end and the diameter of the drainage holes in the screen drum preferably being increased towards the discharge end and the shaft preferably being displaceable, and with feeding means being mounted at one end of the screen drum and plug forming means and discharge means at its other end. Said screw thickener is preferably provided with only one flight.

It is preferably known to dewater fibrous materials, e.g. such having a concentration of about 1 %, and then to beat them at higher concentration. Usually beating is necessary for the fibrous material to obtain the required strength; the object of dewatering before beating is reducing the amount of power necessary for beating. Now it has been found that additional advantages in this respect can be obtained with a device according to the invention. The present screw thickener is especially suitable for use with return paper which is dissolved or treated in a pulper, and the pulp obtained after beating is substantially uniform and free of non-dissolved pieces of paper. The present screw thickener is characterized in that the screen drum is under an interior hydrostatic superpressure of at least 10 kPa (1.45 psig), i.e. at least 1 m (meter) column of water, and preferably at least 15 – 25 kPa, as measured at the highest interior point of the screen drum, and that the plug forming means is provided with a pulling compression means.

The screen drum, the envelope of the flights as well as the shaft can be cylindrical. The drainage holes can e.g. be of equal size along the whole screen drum.

According to the present invention the screen drum is under an internal hydrostatic overpressure of at least 10 kPa, which hydrostatic overpressure e.g. can be brought about by means of a pump or by the feed conduit to the screw thickener being filled up to a level of at least 1 m above the highest point of the screw thickener. The present plug forming means with pulling compression means provides a uniform discharge of the pulp and moreover has the advantage that the whole screw thickener can be made shorter and that the motor for operation of the thickener can easily be mounted at the discharge end, which results in simpler bearing problems. In this way the shaft can also be made displaceable by changing the position of the bearing assembly or by displacing the whole motor. This is especially advantageous at the embodiment preferred, in which the screen drum and the envelope of the flights taper towards the discharge end of the thickener and the diameter of the shaft moreover preferably increases conically towards the discharge end. In this way the clearance between the flights and the screen drum can be easily adapted to the pulp being dewatered.

The invention will now be described more in detail with reference to the attached drawing, which shows a suitable embodiment of the invention.

In the drawing a thickener 1 with a screen drum 3 tapering towards the discharge end 2 is shown, the screen holes being arranged so that their diameters increase towards the discharge end 2. In the centre of the conical screen drum 3 a shaft 4 is mounted, whose diameter increases towards the discharge end 2 and on which a flight 5 is mounted in helicoid form, the pitch of the screw thus formed decreasing towards the discharge end 2. At the outlet end 2 there is provided a plug forming means (stuffing means) 6, which is in contact with the circular edge 7 and with the shaft 4. The plug forming means 6 is pressed towards said edge 7 by means of pulling adjustable screws and springs 8, which are at least two, preferably at least three, evenly distributed around the periphery. Said pulling action can also be effected in another way, e.g. hydraulically, but the action must always be a pulling action and not a pushing action.

In operation supply to the thickener 1 is carried out through the inlet 11, in which the level is 2 m (meters) above the highest point of the screen drum 3 by means of an overflow 12, with a pulp obtained by dissolution of return paper and having a concentration (consistency) of 1.8 %. However, the concentration can be in the range of 1 – 10 % and is preferably 3 – 6 %. The pulp slurry is then led through the screen drum 3 and is fed by the flight 5 through the thickener 1 under simultaneous dewatering and reaches a concentration of 27 % at the plug forming means 6. This concentration can however be adjusted between about 10 and 50 %.

What I claim is:

1. In a screw thickener for the dewatering of fiber suspensions having a starting concentration in the range of 1 to 10% and comprising a shaft rotatable in a screen drum provided with at least one flight mounted in helicoid form, the screen drum and the envelop of said at least one flight tapering towards the discharge end and the diameter of the shaft increasing conically toward the discharge end, said screw thickener also including means for feeding at one end of said screen drum and plug forming and discharge means at the other end, the improvement comprising means maintaining an internal hydrostatic overpressure of at least 10 kPa as measured at the highest interior point of the screen drum and means for pulling said plug forming means comprising a plurality of pulling means evenly distributed around the periphery of said plug forming means and externally of said screen drum, and said shaft at said discharge end passing through said plug forming means.

2. A screw thickener according to claim 1 wherein said shaft is supported by a bearing externally of said plug forming means, with a second bearing supporting said shaft at its other end.

3. The screw thickener of claim 1 wherein the pitch of said screw decreases toward the discharge end of said thickener.

4. The screw thickener of claim 1 wherein the diameters of the drainage holes in said screen drum increase in size toward the discharge end.

5. The screw thickener of claim 1 wherein said shaft is supported for longitudinal displacement.

* * * * *